Patented Apr. 21, 1953

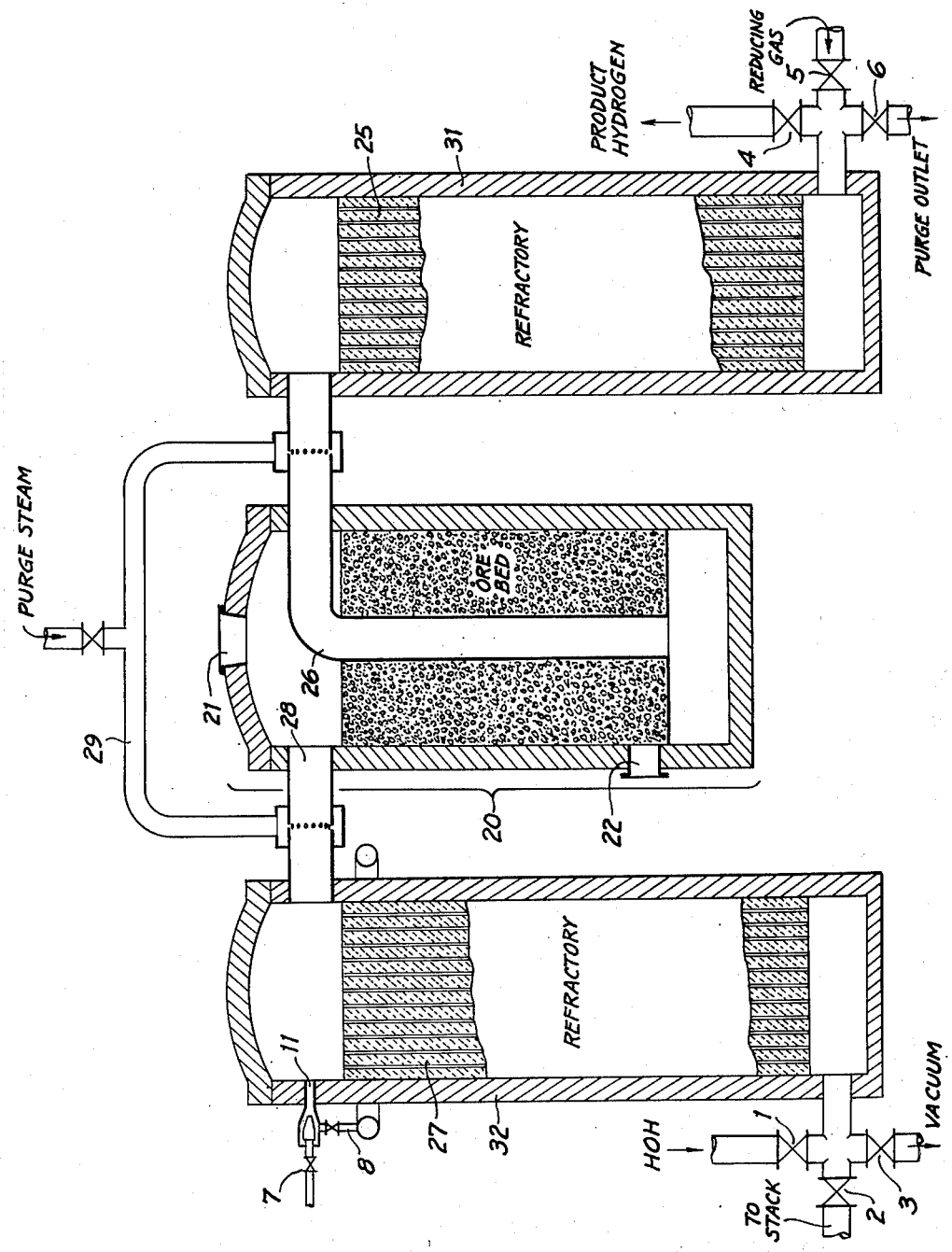

2,635,948

UNITED STATES PATENT OFFICE 2,635,948

MANUFACTURE OF HYDROGEN

Rudolph Leonard Hasche, Johnson City, Tenn., assignor to Eastman Kodak Company, Rochester, N. Y., a corporation of New Jersey Application November 6, 1948, Serial No. 58,698

10 Claims. (Cl. 23—214)

This invention concerns a method of producing hydrogen on an industrial scale. More particularly it is concerned with a method and apparatus for the production of a relatively uncontaminated hydrogen wherein certain gases heretofore considered as waste gases may be utilized.

The production of hydrogen is relatively old in the art. Of course, particularly excellent hydrogen may be produced electrolytically. However, this is a rather expensive source of pure hydrogen as respects industrial requirements which may involve the use of hundreds of thousands of cubic feet of hydrogen daily. Therefore, in industry at the present time there is a method of producing hydrogen in use frequently referred to as the steam-iron process. This type of process is described in many books on chemistry or elsewhere. Hence, the nature thereof is only briefly mentioned herein.

In accordance with such process hydrogen is prepared by passing H₂O over a reducing material such as iron ore. A relatively pure hydrogen is liberated from the H₂O and the oxygen combines with the iron, forming iron oxide. Of course, such a process could be operated by continuously supplying new metal, but this would be expensive. Hence, in the prior art it is customary to reduce the iron oxide in alternate cycles. Such reduction is accomplished by water gas containing around 50 percent hydrogen and a quantity of carbon monoxide of similar magnitude. This results in the production of a hydrogen containing at least traces of carbon monoxide, thereby rendering the hydrogen sufficiently contaminated to prevent its use for some purposes. It has been proposed to treat such hydrogen, containing carbon monoxide, by various methods which catalytically or otherwise remove or at least reduce the quantity of the contaminating carbon monoxide. Such added steps, of course, increase the cost of producing a carbon monoxide-free hydrogen and in some instances are not entirely effective in giving a hydrogen that is completely uncontaminated. For example, in the event the carbon monoxide is being removed catalytically, as the catalyst becomes old its efficiency decreases and traces of carbon monoxide contaminant may remain in the hydrogen, being thus further treated.

I have found what is believed to be a new method of producing hydrogen industrially which hydrogen is of a reasonably high concentration as produced and which may be regarded as fundamentally free of carbon monoxide contamination, inasmuch as carbon monoxide is avoided in my processes, as will be set forth in detail hereinafter.

This invention has for an object to provide a method for producing hydrogen that is relatively free of carbon monoxide contaminant. Another object is to provide an improved and efficient method for producing hydrogen industrially in a concentration from 83 percent to greater than 99 percent and fundamentally free from carbon monoxide or other such reactive contaminants. Still another object is to provide a method of producing high quality hydrogen as indicated, by a new method utilizing reducing gases currently regarded as waste or low value gases. A further object is to provide a method and apparatus for producing hydrogen gas as above described involving a relatively low cost in equipment and low capital investment. Still a further object is to provide a method of producing hydrogen which not only is fundamentally free of carbon monoxide but which is likewise free of sulfur or sulfur compounds. It is also an ancillary object to provide a process of producing hydrogen of the character indicated which also in some instances may permit the production of an inert gas such as nitrogen. A further object is to provide novel apparatus arrangements for producing high quality hydrogen as above described, in a more economical manner than heretofore accomplishable. Other objects will appear hereinafter.

For a more complete understanding of the present invention reference will be made to the attached drawing forming a part of the instant application. The attached drawing is a semi-diagrammatic side elevation view illustrating one type of apparatus arrangement which may be used in carrying out the process of the present invention on a large scale. Further description of this apparatus and its method of operation will be set forth in connection with some of the examples which follow in the present specification.

As indicated above, the processes in use for producing hydrogen on a large scale industrially employ water gas which contains a large amount of carbon monoxide, for example 30 percent or more, in its make-up. In addition, as also mentioned above, for reducing the iron oxide it has heretofore been customary to employ a gas, not only containing carbon monoxide, but which contains at least 40 percent or 50 percent of hydrogen.

In direct contrast to the prior art use of a reducing medium containing high hydrogen and carbon monoxide I have discovered that a reducing medium free of carbon monoxide and even one low in hydrogen may be employed for producing hydrogen industrially in accordance with the process of the present invention. Furthermore, certain gases heretofore regarded as waste gases may be utilized in my process provided certain steps are employed as will be set forth in detail.

It is readily apparent that inasmuch as the reducing medium which I employ in my process is initially fundamentally free of carbon monoxide that at the outset the major chance of carbon monoxide contamination in the final hydrogen has been minimized or eliminated. Apparently the utilization of such sources of reducing medium have been overlooked prior to my invention as a possible medium in the production of relatively pure hydrogen. That is, these gases heretofore regarded as waste gases or of extremely low commercial value, if properly utilized, such as in accordance with the present invention, may be instrumental in the obtaining of a high quality industrial hydrogen free from carbon monoxide contaminant. In general the types of reactions employed in my invention are known and may be formulated as follows:

(1)
$$Fe_3O_4(\text{spathic iron ore}) + \text{reduction} \rightarrow 3Fe + 4H_2O$$
(2)
$$3Fe + 4H_2O \rightarrow Fe_3O_4 + 4H_2$$

However, it will be observed in the present invention that the special manner of operating the reduction of Step 1 and certain of the other steps are carried out so as to prevent contamination as well as to operate in a more economical manner. That is, by carrying out the reduction with a source of hydrogen, unlike water gas of the prior art, and free of carbon monoxide, the reducing metal such as iron is not contaminated with carbon monoxide which can impair the hydrogen subsequently generated. Even though a very lean reducing gas containing only 10 or 15 percent hydrogen is used in this reduction, by the several steps of my invention it is possible to generate, not only a hydrogen fundamentally uncontaminated with carbon monoxide, but hydrogen of a concentration of 85 percent to in excess of 99 percent.

Referring to the above reaction number (1) I have found that this reaction can be made to proceed at temperatures from 650° C. to above 1,000° C., with very satisfactory reaction rates being obtained in the temperature range around 900° C. I have found that this reaction may be made to take place even with a gas containing only a small percentage of hydrogen and free of carbon monoxide. As will be pointed out in detail hereinafter, in some instances in using such a very lean reducing medium it may be desirable to first apply a treatment with a richer reducing medium to instigate the reduction, after which the lean reducing medium may be employed. Since there is apparently no equilibrium established by this reduction of the metal oxide the progress of the operation is not restricted by the partial pressure of the hydrogen in the reducing medium and therefore the lean hydrogen gases can be used in the present invention for returning the metal oxide to metal for further hydrogen regeneration from water. However, as will be noted from the description which follows, when using lean reducing medium in accordance with the present invention I have discovered that it is desirable to employ an impervious type of environment and/or certain purges. The reason for this is that the 80 or 90 percent other components which may comprise the balance of the lean hydrogen tends to be taken up in the apparatus and metal becoming again liberated in the step of making the pure hydrogen. Therefore, unless provision is made for handling the "breathing" of the apparatus, etc., the final hydrogen produced may contain diluent and will not be of a high concentration. Gas rates of the order of 1,500 to 5,000 space velocity have been found to be suitable in my process.

Referring to reaction (2) above, this reaction for making the final hydrogen operates under temperature conditions about the same as those discussed with respect to reaction (1). However, the speed of reaction is greater. Hence, the oxidation cycle of reaction (2) may be shorter than the cycle of reaction (1).

As set forth above, in my process of the present invention, rather than employ water gas containing around 50 percent hydrogen together with 30 or more percent carbon monoxide, as has been customary in the prior art, I use a reducing medium comprised of, for example, from 10 percent to as high hydrogen as may be available in the waste gas or low cost gas available and preferably containing no carbon monoxide and in no event an amount of carbon monoxide greater than 1½ percent. Such a type gas containing for example around 10 to 20 percent hydrogen, the balance principally nitrogen, is available industrially as a by-product or waste gas from certain type chemical processes. Also there are available from certain thermal cracking operations in the production of olefins and other unsaturates, gases classified as waste or fuel gases which contain around 20 percent hydrogen and in some instances this hydrogen may run up to 70 percent. As indicated, in my invention, it is important that the carbon monoxide content in such gases be negligible or absent.

I have found that in using these, usually lean hydrogen gases that are fundamentally free of carbon monoxide, not only does this materially contribute to the production of an excellent industrial hydrogen, but contrary to prior thoughts on the subject, a concentrated industrial hydrogen of greater than 99 percent concentration can be obtained, if desired, using the process of the present invention.

A further understanding of the principles of the instant invention illustrating the use of such type waste gases in a process for producing industrial hydrogen will be apparent from the following general data. In considering this information it will be kept in mind that the first material set forth concerns small scale runs for generally illustrating operation, whereas the later examples described are with respect to large scale production where heat economy and the like factors have been taken into consideration.

Therefore, for a further understanding of the broader aspects of the present invention reference may be made to the following general description and data.

A sample of spathic iron ore (English) was crushed to pass a 4 mesh U. S. Sieve and be retained in 10 mesh U. S. Sieve. A dense quartz tube 28 inches long by 1⅛ inches internal diameter was fabricated with ⅛ inch thermocouple well passing down the center of the tube for a length of 20 inches. An outlet tube was sealed near the discharge end of the tube. The relatively impervious reactor was fitted with a 750 watt Nichrome heating element. The crushed and screened iron ore was packed into the reactor. The reactor was supplied with an "In" gas meter, and "Off" gas meter, a thermocouple, and a transformer to control the heat input.

Below is a series of runs showing the behavior of this apparatus under the conditions tried when using a lean gas mixture containing 12.7 percent hydrogen and 87.3 percent nitrogen.

| Run No. | In Gas Rate, C. F. H. | Catalyst Temp., °C. | Vol. Gas Passed | Vol. Gas Absorbed Corr'd. | Vol. Gas Liberated Corr'd. | Reduction Ave. Off Gas Comp., Percent $H_2$ | Oxidation Ave. Off Gas Comp., Percent $H_2$ |
|---|---|---|---|---|---|---|---|
| 1 | 4.0 | 785 | 8.07 | 0.34 | 0.80 | 7.6 | 95.3 |
| 2 | 4.0 | 840 | 12.4 | 0.52 | 0.76 | 9.3 | 95.8 |
| 3 | 4.0 | 875 | 7.9 | 0.35 | 0.808 | 7.1 | 97.1 |
| 4 | 4.0 | 918 | 9.9 | 0.61 | 0.789 | 5.0 | 97.1 |
| 5 | 4.0 | 945 | 7.9 | 0.52 | 1.64 | 7.6 | 98.0 |
| 6 | 8.0 | 940 | 6.5 | 1.21 | 0.39 | 0.8 | 96.5 |
| 7 | 4.0 | 980 | 22.6 | 1.28 | 0.633 | 7.7 | 97.7 |
| 8 | 2.0 | 980 | 5.0 | 0.46 | 0.402 | 4.7 | 96.8 |
| 9 | 4.0 | 1050 | 13.8 | 0.70 | 0.665 | 4.1 | 97.4 |
| 10 | 4.0 | 1110 | 7.0 | 0.48 | 0.452 | 5.3 | 97.2 |

Typical analysis of the average gas composition taken during the oxidation cycle is shown by the gas from Run No. 8.

|   | Percent |
|---|---|
| $CO_2$ | 0.6 |
| Unsaturated hydrocarbons | 0.0 |
| $O_2$ | 0.2 |
| $CO$ | 0.0 |
| $H_2$ | 96.8 |
| $N_2$ | 2.4 |

Since no efforts were made to purge the above apparatus some residual nitrogen will be found in the hydrogen. The $CO_2$ is fairly low and could be removed if desired. The absence of carbon monoxide is thought to be very significant.

In order to test the feasibility of using iron other than natural ore, a sample of powdered iron oxide was obtained from a source of supply from which this finely powdered iron oxide is a by-product. The iron oxide powder was coated on the surface of Carborundum pellets of essentially the same size as the crushed spathic iron ore described above.

A 200 cubic centimeter charge was placed in a steel reactor of the same design and essentially the same dimensions as the quartz reactor previously described.

Steam was passed over this catalyst at about 890° C. for about 1.5 hours. After this oxidation stage, a lean gas mixture containing 11.5 percent hydrogen and 88.5 percent nitrogen was passed over the oxidized iron at 890° C. The affinity for hydrogen was observed to be low.

An activation of the catalyst was accomplished by passing essentially pure hydrogen over the iron oxide at 900° C. The following oxidation stage or steaming operation generated a satisfactory amount of relatively pure hydrogen.

Runs reported below were made using this second catalyst after activation using the lean gas, 11.5 percent hydrogen and 88.5 percent nitrogen.

From the data presented it may be concluded that iron supplied by iron ores such as the previously mentioned English spathic ore, from the sulfur-free Swedish iron ore or from powdered iron oxides obtained from certain by-product sources can be satisfactorily used. In some instances if the lean gas does not seem to function a preliminary treatment with concentrated hydrogen will activate.

If natural iron ores are used they should be as free from iron sulfides as possible. The hydrogen tends to convert the iron sulfides into hydrogen sulfide which may require removal when the hydrogen is to be used for certain industrial purposes. It appears that this conversion of iron sulfides to hydrogen sulfide becomes more significant with increase in temperature.

It is thought that the above data establishes that it is possible to employ hydrogen and even lean hydrogen, fundamentally free of carbon monoxide in the restoring of the metal oxide to metallic condition for its use in the subsequent generation of hydrogen. It will further be observed from the data that the efficiency of hydrogen removal from the feed stock is highest during the first few minutes of the reducing cycle and thereafter drops off fairly regularly with time. For example, gas samples taken during run #6 show an increasing hydrogen content in the effluent gas with increase in time of the run 6—1, 4 percent hydrogen; 6—2, 6.6 percent hydrogen; 6—3, 10 percent hydrogen. Thereafter, in considering a large scale installation, as will be discussed in detail hereinafter, if it is desired to remove all of the hydrogen from a certain feed stock a large number of catalyst units running on shorter cycles may be employed. On the other hand, if lower investment cost is of significance and an excess of hydrogen containing feed stock is available less efficient removal of the hydrogen with fewer units together with longer cycles may be preferred.

Another possible operational arrangement would be to pass the gas through a designated reactor for say 10 minutes. After this time period the off gas from the designated reactor would be fed into a second reactor for 7 minutes. The second reactor could then be used for the first 10 minute cycle using gas of higher hydrogen content. It is, therefore, apparent and will be

| Run No. | In Gas Rate, C. F. H. | Catalyst Temp., °C. | Vol. Gas Passed | Vol. Gas Absorbed Corr'd. | Vol. Gas Liberated Corr'd. | Reduction Ave. Off Gas Comp., Percent $H_2$ | Oxidation Ave. Off Gas Comp., Percent $H_2$ |
|---|---|---|---|---|---|---|---|
| 11 | 4.0 | 892 | 8.0 | 0.62 | 0.48 | 9.7 | 95.2 |
| 12 | 4.0 | 900 | 8.0 | 0.66 | 0.66 | 7.5 | 94.6 |
| 13 | 4.0 | 950 | 8.0 | 0.49 | 0.46 | 7.3 | 96.6 | further apparent from the large scale installation described below that the present invention is susceptible of some flexibility of operation. Hence, the specific installation to be described should be regarded as an illustration of a preferred embodiment and not as an undue limitation upon the present invention.

Referring now to the attached drawing there will be described a large scale unit and its operation which may be used for producing from 100,000 C. F./day of hydrogen to, for example, 300,000 C. F./day thereof, depending upon the dimensions. It will be noted that it does not require a setup twice as large to produce twice as much hydrogen as will be apparent from the data which follows.

Referring to the drawing the catalyst unit overall is shown at 20. This unit which contains the ore bed may be of more or less conventional construction. That is, the ore bed is supported within a suitable heat resistant housing such as refractory brick, lagged metal, or the like. However, as mentioned above and as will be further explained, it is preferred in the present invention that wherever possible impervious materials be employed. This is desirable in the present invention becasue the "breathing" of the equipment tends to dilute the concentration of the industrial hydrogen being produced. In the present process wherein, for example, a lean hydrogen is used for reduction, say, containing under 20 percent of hydrogen the balance, for example, nitrogen I have discovered that by controlling the "breathing" in any one of several ways, it is quite feasible and economical to use such lean hydrogen as has heretofore been regarded as either a waste or low value gas.

The housing which carries the ore bed is provided with suitable manholes such as at 21 and 22 in order that access may be gained to the ore bed for the changing thereof or the like. Also a manhole as at 21 may be useful for introducing heating medium, such as when the apparatus is being first started.

The specific dimensions of the apparatus will depend upon the quantity of hydrogen which it is desired to manufacture. I have found that, for example, with an ore bed only about 4 feet in diameter and about 10 feet high that upwards of 100,000 C. F./day of hydrogen may be generated with excellent heat economy. On the other hand, by merely increasing the diameter of the ore bed less than twice with the same height the production of hydrogen per day may be tripled.

The ore bed is communicatively connected with special type regenerators as follows:

Regenerator 25 is connected by means of conduit 26 which extends to the chamber embracing the bottom of the ore bed as shown.

Regenerator 27 is connected by means of conduit 28 to the chamber embracing the top of the ore bed. Both conduits 26 and 28 are interconnected with conduit 29 in a manner whereby a steam purge may be simultaneously introduced.

Referring now to the specific regenerators 25 and 27, I have found that it is of great importance from the standpoint of low cost operation, particularly when utilizing the lean hydrogen of the present invention, that the construction of these units 25 and 27 conform to the construction set forth in detail hereinafter. It will be noted at the outset that regenerators heretofore used and comprised of the conventional checkerwork would be highly unsatisfactory. Such usual checkerwork regenerator, not only would not permit of desirable operating speed, but the efficient utilization of the carbon monoxide-free lean reducing gas of the present invention, which may only contain small amounts of hydrogen, would not be possible. In other words, from the practical and economic standpoint, in using a lean gas, such as may be used in the present invention if the heat input to, for example, 80 per cent of nitrogen were not efficiently recovered, it is apparent that the heat losses would be such that the process would be uneconomical. On the other hand, with the apparatus arrangement of the present invention it will be observed that the diluent which may be present with the lean hydrogen may be caused to perform the useful function of taking up exothermic heat generated in the make step which is recovered in, for example, unit 27.

In detail it will be observed that the construction of regenerator units 25 and 27, in contrast to the usual checker brick construction of prior art regenerators will be comprised of elongated narrow passageways of silicon carbide refractory. That is, units 25 and 27 rather than being filled with checker brick will be filled with silicon carbide refractory members not greater than about 1½ inches thick. These refractory members will be positioned within the housings 31 and 32 to form a plurality of elongated slot passageways ¼ to ½ inch thick, approximately 7½ to 30 feet long and several feet wide. In the preferred construction the ratio of the area on any cross section through either regenerator 25 or 27 of slot to area of refractory will be between 1:3 to 1:4. The ratio of the surface of any one of the passageways expressed in square feet to the volume of the passageways expressed in cubic feet will be greater than 30.

The housings 31 and 32 containing the aforementioned elongated slot passageways may be of the usual construction. Hence, extended description is unnecessary. However, as previously mentioned, the firebrick or other heat resistant material used in constructing housings 31 and 32 will preferably be as dense and impervious material as may be conveniently secured. As already discussed, I have discovered that the more impervious environment that may be employed eliminates or minimizes "breathing" of the apparatus which tends to reduce the concentration of the final hydrogen being produced. Also reduction of "breathing" by employing an impervious environment as herein described, reduces the load taken care of by the purges which will be described in detail hereinafter.

The use of such elongated passageways in regenerators 25 and 27 is extremely favorable in, not only permitting rapid operation, but in subtracting heat so that the handling of a lean gas, such as one containing 12 percent hydrogen and 88 percent diluent, such as nitrogen, is entirely practical without undue cooling or heat losses occasioned by the passage of the 88 percent diluent.

Referring further to the attached drawing, regenerator units 25 and 27 are in the preferred embodiment constructed from silicon carbide refractory and are provided with a number of valved conduits for facilitating the carrying out of the present invention. That is, regenerator 27 is provided with the means 1 for introducing steam and exhaust 2 which may be closed or opened leading to a stack (not shown), and a means 3 for applying vacuum, all of which are suitably connected to the lower part of regenerator 27.

Likewise regenerator 25 at the lower part thereof is provided with suitable means such as a valved conduit 4 for drawing off the final hydrogen as well as a means 5 for introducing the lean reducing gas of the present invention. Another valved conduit 6 may function as an outlet for the purge gas as will be further apparent from the process description that follows.

Usually it is sufficient to provide burners 11 on only one of the regenerators although such burners may be incorporated as desired. As previously mentioned, if added heat is required at the start, this can conveniently be incorporated through manhole 21. Therefore, the burners 11 in regenerator 27 are generally sufficient to supply such added heat as is necessary for making up any requirements of the process. A particularly useful burner construction is shown in U. S. Patent 2,183,596. Hence, further detailed description is unnecessary, excepting to mention that any burner would be suitably supplied by fuel and air through means 7 and 8 as diagrammatically indicated on the attached drawing.

Turning now to the carrying out of the process of the present invention in the large scale unit shown in the attached drawing, procedure would be as follows: The apparatus would be brought up to the desired operating temperature, between 600° C. and 1,000° C. and preferably around 900° C. by supplying heat from burner 11 and temporarily through manhole 21. Assuming that reduced metal is contained in the catalyst unit 20, valves 2, 3, and 5 being closed and valves 1 and 4 being open, HOH is introduced through 1. The steam in passing through the elongated heated slots of regenerator 27 rapidly attains the temperature of say 900° C. and pass through conduit 28 into contact with the ore bed in catalyst unit 20. During the passage of the steam through the ore bed hydrogen uncontaminated with carbon monoxide and of a concentration of at least 80 percent is generated with the evolution of considerable heat. This hot hydrogen passes through conduit 26 into regenerator 25 where the hydrogen quickly gives up its heat to the elongated slot passageways in regenerator 25, the final hydrogen passing out through 4 to a gas holder.

After this oxidation cycle has continued for such a period that the metal has become converted to oxide in unit 20 valves 1 and 4 are closed and valves 2 and 5 are opened. The lean carbon monoxide-free reducing gas of the present invention is then introduced at 5 and during its passage through regenerator 25 takes up the heat from unit 25 and passes via conduit 26 into contact with the ore bed in unit 20. This hot lean reducing gas I have found satisfactorily restores the oxide to the metallic condition without contaminating the metal with carbon monoxide that could subsequently find its way into the finished hydrogen. The used lean reducing gas escapes through conduit 28 into contact with regenerator 27 which subtracts such useful heat as may remain therein. Finally the lean reducing gas escapes to the stack through conduit 2. As already mentioned above, the length of the reduction cycle and the like factors depend upon such details as how much hydrogen it is desired to strip out of the lean hydrogen in a pass.

While the heat balance is very excellent in the above arrangement, a certain amount of additional heat will be incorporated from time to time by burner 11. That is burner 11 will be operated long enough to bring the temperature of the apparatus back to say, for example, 900° C. Assuming that it is desired to produce a very concentrated hydrogen, the steps of purging will now be considered. The passage of the lean reducing gas of the present invention through the equipment has left therein a certain amount of, for example, diluent such as nitrogen which diluent would be given up on the next cycle to, for example, reduce the concentration of hydrogen from greater than 99 percent to say 85 percent. However, this aspect may be taken care of by the introduction of steam through conduits 26 and 28 simultaneously and flowing it through the entire apparatus. Both valves 2 and 6 may be opened for permitting the escape of the purging medium.

In addition to one or more steam purges, aforementioned, by closing the various valves other than valve 3 and applying reduced pressure at valve 3 a vacuum purge may be accomplished which will still further eliminate any diluent not removed by the steam purge.

The matter of purging may be recapitulated as follows:

Purging is provided for in the regenerators first with steam and then followed by two vacuum purges of the regenerators and the converter down to a pressure of 5 p. s. i. absolute. After each evacuation, steam is to be admitted to atmospheric pressure. Strength of hydrogen gas which can be controlled with centainty, taking into account volumes of voids and porosity of refractory, by simple gas displacement is as follows:

1. Without purge—83% hydrogen
2. Steam purge only of steam regenerators— 90.5% hydrogen
3. One vacuum purge—96.5% hydrogen
4. Two vacuum purges—99.2% hydrogen.

The various cycles which have been described above may be summarized as follows:

Reduction period—10 minutes
Make period—5 minutes
Purging and valve change—8 minutes The above operations may be accomplished automatically by using the automatic valves and timers which are available commercially. The amount of steam and energy required for the above purges is entirely practical and economical. For example, a thorough steam purge of the above type of large scale apparatus may be accomplished with only about 1,600 cubic feet of steam. As already indicated, as the elongated slot regenerators of the present invention are employed very little heat is lost in the process. It may be observed that the endothermic heat involved in reducing the metal oxide back to metal is largely recovered in my regenerators in later steps from the exothermic heat in the oxidation cycle. Consequently, an improved economical process has been disclosed which permits the use of lean carbon monoxide-free, hydrogen-containing gases which heretofore have been regarded as waste or low value gases. While a gas having only about 12 percent hydrogen has been referred to in particular, carbon monoxide-free gases containing 20 percent hydrogen, 30 percent hydrogen, or even 80 percent hydrogen may be used. However, the last mentioned type gas which in itself is fairly rich in hydrogen may get out of the waste gas category. On the other hand, the process is particularly attractive when applied to a residue gas such as results from the cracking of natural gas to acetylene. After the latter constituent is removed a residue gas remains which may contain 75 percent hydrogen and 25 percent methane. It is ideally suited for use in the process I have disclosed, yielding a pure hydrogen gas and separating methane which may be recycled to the cracking process. Thus a dual purpose is performed by the use of the instant process. This is illustrated by the following example.

A residue gas from a chemical cracking process producing acetylene from natural gas, which contained 75 percent hydrogen and 25 percent methane was used for activation of the iron oxide catalyst by procedure the details of which have already been set forth. The off gas from the reduction step analyzed 94 percent methane and 6 percent hydrogen which could be returned to the cracking operation. During the make period a hydrogen gas was obtained analyzing 99 percent hydrogen and 1 percent methane.

As discussed above, in the event the treatment with the lean gas does not at the outset seem to function, a short preliminary treatment with concentrated hydrogen seems to function as an activation which permits the subsequent use of the lean hydrogen of the present invention. While the sequence of steps described are preferred, some variation is possible. Hence, the foregoing details relative to the various cycles and length thereof are to be regarded as illustrative.

I claim:

1. A process for producing high purity industrial hydrogen which includes repetition of the successive steps of (1) passing steam through a hot refractory mass composed of substantially impervious material which has relatively little tendency for "breathing" as a result of adsorption and absorption of gases passed in contact with it, and thereby raising the temperature of said steam to greater than 650° C., (2) contacting the heated steam with a mass of metallic iron of a type suitable for use in a steam-iron process wherein the iron is converted to iron oxide and industrial hydrogen liberated with the evolution of heat, (3) withdrawing hydrogen liberated by the reaction of said steam and said metallic iron through a second refractory mass composed also of substantially impervious material, said second mass being relatively cool and thereby cooling said hydrogen and storing in said second mass heat removed from the hydrogen produced, (4) thereafter passing a substantially carbon monoxide-free reducing gas lean in hydrogen and comprised of about 10-20% hydrogen, the balance largely nitrogen, and containing not more than about 1.5% carbon monoxide through the second mass whereby the lean reducing gas is heated to a temperature in excess of 650° C., (5) conducting the lean heated reducing gas into contact with a mass of iron oxide produced in the reaction of steam and iron for reconverting said mass of oxide back to the form of a mass of metallic iron, and (6) purging the masses for removing any residual nitrogen which may have remained in the masses whereby a high quality, high concentration of industrial hydrogen is produced.

2. A process as defined in claim 1 wherein the reducing gas is an off-gas resulting from the cracking of hydrocarbons to obtain unsaturated hydrocarbons.

3. A process as defined in claim 1 wherein the step of contacting the reducing gas with the iron oxide mass is conducted at a temperature within the range of about 650° C. to at least about 1000° C.

4. A process as defined in claim 3 wherein the step of contacting the reducing gas with the iron oxide mass is carried out at a space velocity of 1500–5000.

5. A process as defined in claim 4 including as an additional step immediately prior to the step 5 reduction, contacting the mass of iron oxide with a hydrogen-rich reducing gas for a relatively small period of time whereby to activate said iron oxide for the step of reduction with lean reducing gas.

6. A process as defined in claim 3 wherein immediately prior to the step 5 reduction there is conducted an additional step comprising heating the mass of iron oxide by means of hot combustion gases.

7. A process as defined in claim 3 wherein the reducing gas is entirely free of carbon monoxide.

8. A process for producing high purity industrial hydrogen which includes repetition of the successive steps of (1) passing steam through a hot first refractory mass composed of substantially impervious material which has relatively little tendency for "breathing" as a result of adsorption and absorption of gases passed in contact with it, and thereby raising the temperature of said steam to greater than about 650° C., (2) contacting the heated steam with a mass of metallic iron of a type suitable for use in a steam-iron process wherein the iron is converted to iron oxide and industrial hydrogen liberated with the evolution of heat, (3) withdrawing hydrogen liberated by the reaction of said steam and said metallic iron through a second refractory mass composed also of substantially impervious material, said second mass being relatively cool, and thereby cooling said hydrogen and storing in said second mass heat removed from the hydrogen produced, (4) thereafter passing a substantially carbon monoxide-free reducing gas lean in hydrogen and comprised of about 10–20% hydrogen, the balance largely nitrogen, and containing not more than about 1.5% carbon monoxide through the second mass whereby the lean reducing gas is heated to a temperature in excess of 650° C., (5) conducting the lean heated reducing gas into contact with a mass of iron oxide produced in the reaction of steam and iron for reconverting said mass of oxide back to the form of a mass of metallic iron, (6) purging the refractory and iron masses with steam, (7) purging the masses by the application of reduced pressure thereto, and (8) finally, prior to passing further oxidizing steam through the masses, as aforementioned, purging the masses by the application thereto again of reduced pressure for removing any residual nitrogen which may have remained in the masses whereby a high quality, high concentration of industrial hydrogen is produced.

9. A process for producing high purity industrial hydrogen which includes repetition of the successive steps of (1) passing steam through a hot first refractory mass composed of substantially impervious material which has relatively little tendency for "breathing" as a result of adsorption and absorption of gases passed in contact with it, and thereby raising the temperature of said steam to greater than 650° C., (2) contacting the heated steam with a mass of metallic iron of a type suitable for use in a steam-iron process wherein the iron is converted to iron oxide and industrial hydrogen liberated with the evolution of heat, (3) withdrawing hydrogen liberated by the reaction of said steam and said metallic iron through a second refractory mass composed also of substantially impervious material, said second mass being relatively cool and thereby cooling said hydrogen and storing in said second mass heat removed from the hydrogen produced, (4) thereafter passing a substantially carbon monoxide-free reducing gas comprised of about 10-80% hydrogen and containing not more than about 1.5% carbon monoxide through the second mass whereby the reducing gas is heated to a temperature in excess of 650° C., (5) conducting the heated reducing gas into contact with a mass of iron oxide produced in the reaction of steam and iron for reconverting said mass of oxide back to the form of a mass of metallic iron, and (6) purging the masses for removing any residual nitrogen which may have remained in the masses whereby a high quality, high concentration of industrial hydrogen is produced.

10. A process as defined in claim 9 wherein said reducing gas is a mixture separated from a thermal cracking effluent and comprising 10-80% hydrogen, the balance largely methane, wherein the impervious material is silicon carbide, and wherein the purging procedure comprises the steps of purging the carbide and iron masses with steam, purging the masses by the application of reduced pressure thereto, and finally, prior to passing further oxidizing steam through the masses, as aforementioned, purging the masses by the application thereto again of reduced pressure for removing any residual methane which may have remained in the masses whereby a high quality, high concentration of industrial hydrogen is produced.

RUDOLPH LEONARD HASCHE.

References Cited in the file of this patent

UNITED STATES PATENTS

| Number | Name | Date |
|---|---|---|
| 324,179 | Sloper | Aug. 11, 1885 |
| 517,202 | Westman | Mar. 27, 1894 |
| 533,643 | Hawkins | Feb. 5, 1895 |
| 971,206 | Messerschmitt | Sept. 27, 1910 |
| 1,102,716 | Bosch | July 7, 1914 |
| 1,225,262 | Messerschmitt | May 8, 1917 |
| 1,225,263 | Messerschmitt | May 8, 1917 |
| 1,896,916 | Perley | Feb. 7, 1933 |
| 2,379,423 | Cape et al. | July 3, 1945 |
| 2,449,635 | Barr | Sept. 21, 1948 |
| 2,498,444 | Orr | Feb. 21, 1950 |

OTHER REFERENCES

"Industrial Hydrogen" by Taylor (1914), pages 25-60, The Chemical Catalog Co., N. Y.